United States Patent Office 3,654,080
Patented Apr. 4, 1972

3,654,080
PROCESS FOR ISOMERIZING GLUCOSE TO FRUCTOSE
Barbara L. Bengtson and William R. Lamm, Clinton, Iowa, assignors to Standard Brands Incorporated, New York, N.Y.
No Drawing. Filed Jan. 5, 1970, Ser. No. 838
Int. Cl. C12b 1/00; C12c 11/04; C12d
U.S. Cl. 195—31 R
7 Claims

ABSTRACT OF THE DISCLOSURE

The disclosure is directed to a process of enzymatically converting a portion of the glucose in a glucose-containing solution to fructose. Viable microorganisms which contain intracellular glucose isomerase are treated with a toxic agent to destroy at least 95 percent of the microorganisms. The treated microorganisms are cultured to promote growth, and the cellular material therefrom is incorporated into a glucose solution wherein conditions are maintained to convert a portion of the glucose to fructose.

THE INVENTION

This invention relates to a process of enzymatically converting a portion of the glucose in a glucose-containing solution to fructose.

The major use of glucose and corn syrups, which contain glucose, is in food processing, for example in the baking, beverage, canning and confectionery industries, to provide sweetness, body or to regulate crystal growth. However, because glucose inherently lacks a high degree of sweetness and has a relatively bland flavor, its uses are somewhat limited. This is overcome, to some extent, by mixing glucose or corn syrups with sucrose or invert syrups to enhance total sweetness. This has not proven entirely satisfactory, however, because of the economics and the other factors involved. It has been recognized that if during the production of corn syrups and other glucose-containing syrups a significant proportion of the glucose could be converted to fructose, syrups would be provided that are sweet enough to satisfy additional purposes.

It has long been known in the art that glucose can be converted to fructose by heating a glucose-containing liquor, such as a corn syrup, in the presence of an alkaline catalyst. Because of the nonselectivity of the alkaline catalyst various objectionable by-products are produced, such as large amounts of colored bodies and acidic materials. To refine the alkaline isomerized liquor to remove the objectionable by-products therefrom, requires rather complicated and costly refining procedures. Consequently alkaline isomerization, as far as we know, has not been practiced commercially, due probably, to the economics involved with refining such isomerized liquor and the relatively poor quality of the resulting product.

Various microorganisms produce enzymes which isomerize glucose in glucose-containing syrups to fructose. For example, in Japanese Pats. 7428/66 and 7430/66 to Takasaki et al., a number of microorganisms belonging to the Streptomyces genus are disclosed as elaborating glucose, isomerase. Other microorganisms which elaborate glucose isomerase are disclosed, for instance, in Japanese Pats. 11897/65, 20230/65, 7431/66 and 17640/66.

Although glucose isomerizing enzymes are more selective in converting glucose to fructose than is an alkaline catalyst, there are, however, a number of problems associated with the commercial use thereof. The principal problem is that the yield or the amount of glucose isomerase produced by microorganisms is ordinarily relatively small. Also, since the glucose isomerase is produced primarily intracellularly by microorganisms and because it is a common practice to use the whole cells for the isomerization reaction, large quantities of the cellular material must be used. These large quantities of cellular material result in an undesirable amount of handling and transportation, promote undesirable side reactions during the isomerization reaction and physically take up space in the reactor in which the isomerization is performed that could otherwise be used for the glucose solution.

Therefore, it is the principal object of the present invention to provide a process for enzymatically converting glucose to fructose in which microbial cells containing large quantities of glucose isomerase are used as the enzyme source.

This object and other objects of the present invention which will be apparent from the following description are obtained by treating viable microorganisms which contain intracellular glucose isomerase with an amount of a toxic agent which destroys at least about 95 percent of the viable microorganisms, culturing the treated viable microorganisms under conditions to promote growth thereof, incorporating the cellular material therefrom into a glucose-containing solution and maintaining the cellular material in the solution under conditions wherein a quantity of the glucose is converted to fructose. The term "microorganism" referred to herein includes both spores and vegetative cells.

A number of toxic agents may be used in the present process. Exemplary of such agents are nitrogen mustard, B-propionolactone, ethyl carbamate, ethylenimine, hydrogen peroxide, N - methyl - N'-nitro-N-nitrosoguanidine, acriflavine hydrochloride, 8 - ethoxy caffeine, nitrosomethylurea and radiation from radioactive isotopes and ultra violet light. Preferably these toxic agents should be used in amounts and under conditions so that at least 99 percent of the viable microorganisms are destroyed. The microorganisms which have not been destroyed by such a treatment generally produce at least 30 percent and preferably at least 50 percent more glucose isomerase than microorganisms which have not been so treated.

In commercial processes for propagation of microorganisms, it is necessary to proceed by stages. These stages may be few or many, depending on the nature of the process and the characteristics of the microorganisms. Ordinarily, propagation is started by inoculating spores from a slant of a culture into a pre-sterilized nutrient medium usually contained in a shake flask. In the flask, growth of the microorganisms is encouraged by various means, e.g., shaking for aeration and maintenance of suitable temperature. This step or stage may be repeated one or more times in flasks or vessels containing the same or larger volumes of nutrient medium. These stages may be conveniently referred to as culture development stages. The microorganisms with or without accompanying culture medium, are introduced or inoculated into a large-scale fermentor to produce commercial quantities of the microorganisms or by-products therefrom. In the process of the present invention it is preferred to treat the microorganisms with the toxic agent in the initial culture development stage, for instance, in a shake flask containing a suitable nutrient medium. After treatment, cells of the microorganisms may be placed in Petri dishes containing, for example, an agar medium and the cells allowed to sporulate. Spores may then be removed and cultivated to produce microorganisms containing large amounts of glucose isomerase. Other methods of treatment may be used, for instance, spores may be treated with a toxic agent, the toxic agent removed by centrifugation, filtration or the like, the spores washed and transferred into a suitable medium wherein germination is promoted.

After the microorganisms are cultivated, they are separated from the nutrient medium by filtration, centrifugation or the like. Generally a small amount of filter aid is used to facilitate the separation. Treating the microorganisms with a toxic agent according to the present process results in microorganisms which are relatively easily separated from the nutrient medium. Without such a treatment separation is difficult, filtration being prolonged and large quantities of filter aid required. The separated material may then be incorporated directly into a glucose-containing solution and glucose isomerizing conditions maintained. After the desired amount of fructose is formed, the cellular material is separated from the solution by filtration, centrifugation, etc., and the isomerized solution subjected to a refining technique which removes objectionable color and odiferous materials.

In the process of the present invention it is preferred to use microorganisms of the Streptomyces genus and most preferred to use Streptomyces ATCC 21175 or 21176.

The conditions at which the isomerization reaction is performed may vary widely. For instance, the isomerization reaction may be performed at a temperature in the range of from about 50° to about 75° C. but the preferred temperature range is from about 60° to about 70° C. The pH of the reaction mixture typically will be in the range of from about 6 to 7.5 and preferably from about 6.5 to 7. These pH values may be maintained during isomerization by the addition of a suitable alkaline material such as NaOH or $Mg(OH)_2$.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout this specification, percentages refer to percent by weight unless otherwise specified.

The determination of the glucose isomerase activity of the enzyme preparation is based on a modification of the cysteine-carbazole method of Dische and Borenfreund which appeared in the Journal of Biological Chemistry, vol. 192, p. 583 (1951). This method was performed as follows:

A portion of the fermentation broth containing glucose isomerase and substantially no cellular material was incubated at a pH of 7.5 and a temperature of 70° C. in an aqueous medium containing the following:

0.1 M glucose
0.05 M $NaH_2PO_4$
0.005 M $MgSO_4 \cdot 7H_2O$

After one hour, the pH of the reaction mixture was lowered to about 3 by the addition of a 5 percent by weight perchloric acid solution in water to inactivate the glucose isomerase. One milliliter of the reaction mixture, 0.2 milliliter of a 0.2 percent cysteine hydrochloride solution, 5 milliliters of a 75 percent by volume $H_2SO_4$ solution and 0.15 milliliter of 0.12 percent carbazole in 95% ethanol were placed in a test tube, mixed, and the test tube placed in a water bath maintained at 60° C. After 10 minutes the test tube was removed from the bath and cooled rapidly to room temperature. Light absorption of the solution at 560 m$\mu$ was measured and the fructose content of the sample determined.

One International Glucose Isomerase Unit (IGIU) is the quantity of glucose isomerase which will form 7.87 milligrams of fructose under the above conditions. Appropriate blanks were run to compensate for ketoses originally present in the enzyme preparation and those formed by alkaline isomerization.

EXAMPLE I

This example illustrates the use of ethylenimine as the toxic agent for producing a microorganism which forms large quantities of glucose isomerase.

A culture of Streptomyces ATCC 21175 was sporulated on a sterile agar medium containing 0.4 percent xylose, 0.4 percent yeast extract, 1.0 percent malt extract and 2 percent agar. The pH of the medium was 7.3. Spores from this slant were inoculated into a shaker flask containing 100 ml. of a sterile medium composed of 1 percent peptone, 1 percent yeast extract, 0.1 percent $MgSO_4 \cdot 7H_2O$, 0.2 percent agar and 1 percent xylose. The pH of the medium was 7.0. The flask was maintained at 30° C. and shaken at 200 r.p.m. for 16 hours. Then 3.5 ml. of a 0.5 percent aqueous solution of ethylenimine was added to the medium and the flask shaken for 30 minutes. Cells were removed from the medium by centrifugation and the cells were plated onto Petri dishes containing the sterile agar medium described above. The cells were allowed to grow and sporulate. A loop of these spores was transferred into a 300 ml. Erlenmeyer flask containing 100 ml. of sterile medium, at a pH of 7, composed of 1 percent peptone, 1 percent yeast extract, 1 percent xylose, 0.1 percent $MgSO_4 \cdot 7H_2O$, 0.3 percent $K_2HPO_4$, and 0.2 percent agar. The inoculated flask was incubated for 48 hours at 30° C. on a rotary shaker at 200 r.p.m. Twenty ml. of the fermented broth was removed from the flask and transferred into a 2-liter baffled Erlenmeyer flask containing 800 ml. of the medium described immediately above. Another 20 ml. of fermented broth containing Streptomyces ATCC 21175 which was not treated with ethylenimine was transferred into another 2-liter baffled Erlenmeyer flask containing 800 ml. of the same medium. These flasks, at a temperature of 30° C., were shaken for 48 hours at 180 r.p.m. and the entire contents of each flask were separately inoculated into two 40-liter fermentors containing 25 liters of a sterilized medium, at a pH of 7, composed of 1000 grams corn steep liquor (29° Bé.), 6 grams $CoCl_2 \cdot 6H_2O$, 250 grams sorbitol, 190 grams glucose, 1344 ml. cottonseed hydrolyzate, 25 ml. of an antifoaming agent (Pluronic L-61 manufactured by Wyandotte Chemical Co.), and the remainder water. The cottonseed hydrolyzate was prepared by treating a suspension containing 16 percent by weight cottonseed hulls and 2.5 percent by weight $H_2SO_4$ for 10 minutes at 300° F. The hydrolyzate was cooled to about 120–140° F., neutralized to a pH of about 4, filtered and concentrated to 30° Baumé. The fermentors were maintained at a temperature of 30° C., agitated at 200 r.p.m. and aerated with 1 volume of air per volume of medium per minute. After 65½ hours the cellular material was removed by filtration. The cellular material containing the microorganism treated with the ethylenimine was observed to filter faster than did the cellular material containing the microorganism not treated with ethylenimine. The glucose isomerase activity of the filter cake was determined and the results are shown in Table I.

To 800 ml. of corn syrup containing 528 grams dextrose, 0.001 M $CoCl_2$, 0.005 M $MgSO_4$ at a pH of 6.5 was added a sufficient amount of cellular material of the microorganism treated with ethylenimine to achieve a level of 560 IGIU. The mixture was maintained at 70° C. and at a pH of 6.5. After 69 hours the corn syrup contained 44.13 percent fructose dry basis.

TABLE I

| Microorganism: | Glucose isomerase activity (IGIU/g. dry substance) |
|---|---|
| Streptomyces ATCC 21175 | 318 |
| Streptomyces ATCC 21175 treated with ethylenimine | 518 |

The above table shows that when a glucose isomerase producing microorganism is treated with a toxic agent, the yield of glucose isomerase obtained therewith is greatly enhanced.

EXAMPLE II

This example illustrates the use of a combination of toxic agents for producing a microorganism which forms large quantities of glucose isomerase.

Spores from Streptomyces ATCC 21175 were transferred into a 0.3 percent solution of N-methyl-N'-nitro-N-nitrosoguanidine. The solution was agitated for 30 minutes. The spores were removed by centrifugation and suspended in a sterile saline solution. Spores from the saline solution were transferred into a Petri dish containing an agar medium such as described in Example I. The spores were allowed to germinate and resporulate. Spores from a single colony were suspended in a sterile saline solution contained in a Petri dish. The suspension was radiated for 90 minutes by the use of an ultraviolet light (Sylvania-black-light-blue) suspended 30 cm. above the Petri dish. The spores were removed from the saline solution and plated onto Petri dishes containing the sterile medium described in Example I. The spores were handled and the microorganism grown and tested for glucose isomerase activity in the manner described in Example I. The glucose isomerase activity of the treated microorganisms was 459 IGIU per gram dry substance in the fermentor broth.

EXAMPLE III

This example illustrates the use of ultraviolet light for producing a microorganism which forms large quantities of glucose isomerase.

Spores from Streptomyces ATCC 21175 were transferred into a sterile saline solution contained in a Petri dish and were radiated for 2 hours by the use of an ultraviolet light (Sylvania-black-light-blue) suspended 20 cm. above the Petri dish. While the spores were radiated the saline solution was stirred. The spores were handled and the microorganism grown and tested for glucose isomerase activity in the manner described in Example II. The glucose isomerase activity of the treated microorganism was 412 IGIU per gram dry substance in the fermentor broth.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A process for enzymatically converting a portion of the glucose in a glucose-containing solution to fructose which comprises treating viable microorganisms which contain intracellular glucose isomerase with an amount of a toxic agent which destroys at least 95 percent of the viable microorganisms, culturing the microorganisms remaining viable after said treatment under conditions to promote growth thereof, incorporating the glucose isomerase thus produced into a glucose-containing solution and maintaining the glucose isomerase in the solution under conditions whereby a quantity of the glucose is converted to fructose, the treated viable microorganisms being characterized as producing at least about 30 percent more glucose isomerase than untreated microorganisms when cultured under the same conditions.

2. A process for enzymatically converting a portion of the glucose in a glucose-containing solution to fructose as defined in claim 1, wherein the glucose isomerase incorporated into the glucose-containing solution is contained in the cells of cultured microorganisms.

3. A process for enzymatically converting a portion of the glucose in a glucose-containing solution to fructose as defined in claim 2, wherein the microorganisms are selected from the Streptomyces genus.

4. A process for enzymatically converting a portion of the glucose in a glucose-containing solution to fructose as defined in claim 3, wherein the microorganism is Streptomyces ATCC 21175 or ATCC 21176.

5. A process for enzymatically converting a portion of the glucose in a glucose-containing solution to fructose as defined in claim 3, wherein the toxic agent is selected from the group consisting of ethylenimine, N-methyl-N'-nitro-N-nitrosoguanidine and ultraviolet light.

6. A process for enzymatically converting a portion of the glucose in a glucose-containing solution to fructose as defined in claim 3, wherein the glucose solution containing the microorganisms is maintained at a temperature of from about 50° to 75° C. and a pH of from about 6 to about 7.5.

7. A process for enzymatically converting a portion of the glucose in a glucose-containing solution to fructose as defined in claim 6, wherein the glucose solution containing the microorganism is maintained at a temperature of from about 60° to about 70° C. and a pH of from about 6.5 to about 7.

References Cited

UNITED STATES PATENTS 3,012,944  12/1961  Armbruster _____ 195—31

FOREIGN PATENTS 1,103,394  2/1968  Great Britain.

A. LOUIS MONACELL, Primary Examiner

G. M. NATH, Assistant Examiner